United States Patent
Lin

(10) Patent No.: US 6,827,184 B1
(45) Date of Patent: Dec. 7, 2004

(54) SHOCK-ABSORBING DEVICE OF AN AUTOMOBILE

(76) Inventor: Wei-Li Lin, 160, Hsi-Hu Road, Da-Li City, Taichung County (TW)

( * ) Notice: Subject to any disclaimer, the term of this patent is extended or adjusted under 35 U.S.C. 154(b) by 0 days.

(21) Appl. No.: 10/623,441

(22) Filed: Jul. 18, 2003

(51) Int. Cl.[7] ............................................. F16F 19/00
(52) U.S. Cl. ................ 188/321.11; 267/287; 267/221
(58) Field of Search .................. 188/321.11, 322.22, 188/315, 322.16, 314; 267/287, 221, 220, 166, 286

(56) References Cited

U.S. PATENT DOCUMENTS

| | | | | |
|---|---|---|---|---|
| 4,453,638 A | * | 6/1984 | Wallace | 188/314 |
| 4,744,444 A | * | 5/1988 | Gillingham | 267/221 |
| 4,771,996 A | * | 9/1988 | Martinez et al. | 267/220 |
| 5,988,332 A | * | 11/1999 | Marzocchi et al. | 188/322.2 |
| 6,142,268 A | * | 11/2000 | Kuo-An | 267/221 |
| 6,698,559 B1 | * | 3/2004 | Liou et al. | 188/317 |

* cited by examiner

*Primary Examiner*—Robert A. Siconolfi
*Assistant Examiner*—Melanie Torres
(74) *Attorney, Agent, or Firm*—Charles E. Baxley

(57) ABSTRACT

A shock-absorbing device includes an outer threaded tube, a threaded rod having a retractable rod, a compression spring, an adjusting nut, and an urging nut. Thus, when the urging nut on the outer threaded tube is unscrewed, the threaded rod can be rotated relative to the outer threaded tube, thereby adjusting the relative distance between the threaded rod and the outer threaded tube, such that the height of the automobile can be adjusted largely. In addition, the scales of the flat surface can be used to indicate the length of the shock-absorbing device, so that the height of the automobile can be adjusted exactly.

8 Claims, 5 Drawing Sheets

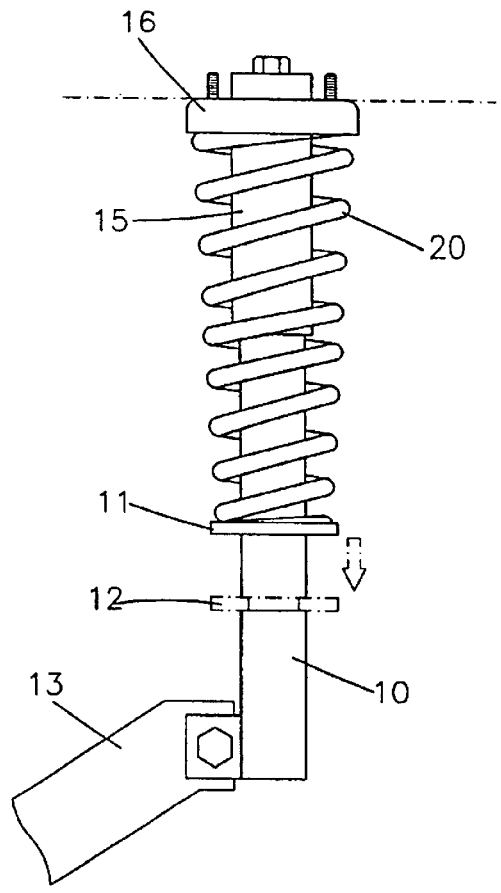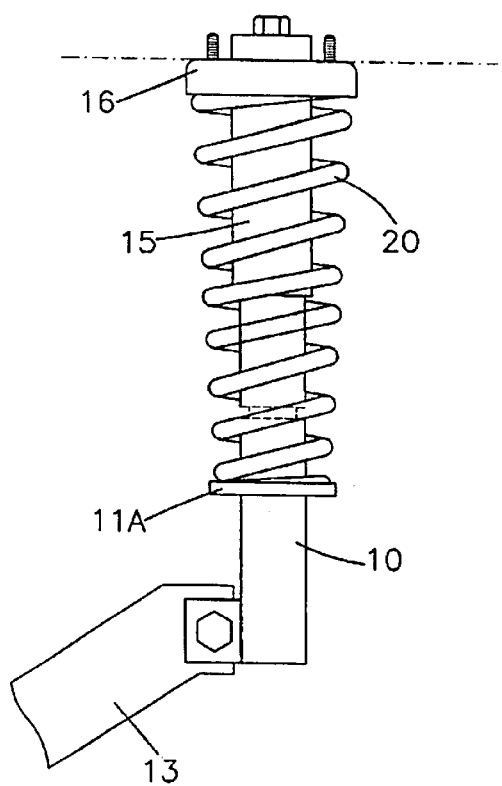
FIG.1
PRIOR ART
FIG.2
PRIOR ART

US 6,827,184 B1

SHOCK-ABSORBING DEVICE OF AN AUTOMOBILE

BACKGROUND OF THE INVENTION

1. Field of the Invention

The present invention relates to a shock-absorbing device, and more particularly to a shock-absorbing device of an automobile.

2. Description of the Related Art

A conventional shock-absorbing device of an automobile in accordance with the prior art shown in FIGS. 1 and 2 comprises a cantilever 13 connected to the tire (not shown) of the automobile, a retractable rod 10 having a lower end mounted on the cantilever 13, a snap ring 11 secured on the retractable rod 10, a jacket 15 mounted on an upper end of the retractable rod 10, a support sleeve 16 mounted on the top end of the jacket 15 and secured to the chassis (not shown) of the automobile, and a compression spring 20 mounted on the retractable rod 10 and urged between the snap ring 11 and the support sleeve 16. Thus, the retractable rod 10 can be retracted into the jacket 15 to compress the compression spring 20, so that the shock-absorbing device can provide a shock-absorbing function to the automobile.

In adjustment of the height of the automobile, the retractable rod 10 is machined and formed with an annular groove 12 for securing a new snap ring 11A. Then, the original snap ring 11 is removed from the retractable rod 10, so that the bottom of the compression spring 20 is rested on the new snap ring 11A. Thus, the chassis of the automobile is lowered by the pulling action of the compression spring 20 to adjust the height of the automobile.

However, the user has to machine the retractable rod 10 to form the annular groove 12 in the retractable rod 10 for securing the new snap ring 11A, thereby causing inconvenience to the user when adjusting the height of the automobile. In addition, the position of the annular groove 12 in the retractable rod 10 cannot be located exactly, so that the height of the automobile cannot be adjusted precisely.

SUMMARY OF THE INVENTION

The present invention is to mitigate and/or obviate the disadvantage of the conventional shock-absorbing device of an automobile.

The primary objective of the present invention is to provide a shock-absorbing device, wherein when the urging nut on the outer threaded tube is unscrewed, the threaded rod can be rotated relative to the outer threaded tube, thereby adjusting the relative distance between the threaded rod and the outer threaded tube, such that the height of the automobile can be largely adjusted easily and conveniently.

Another objective of the present invention is to provide a shock-absorbing device, wherein when the urging nut on the adjusting nut is unscrewed, the adjusting nut can be rotated relative to the threaded rod to change the height of the adjusting nut, thereby adjusting the tension of the compression spring, and thereby micro-adjusting the height of the automobile easily and conveniently.

A further objective of the present invention is to provide a shock-absorbing device, wherein the scales of the flat surface can be used to indicate the length of the shock-absorbing device, so that the height of the automobile can be adjusted rapidly and exactly.

A further objective of the present invention is to provide a shock-absorbing device, wherein the scraper of the flat surface of the threaded rod can be used to scrape the greasy dirt contained in the inner wall of the outer threaded tube during rotation of the threaded rod, so as to clear the inner wall of the outer threaded tube.

In accordance with the present invention, there is provided a shock-absorbing device, comprising:

an outer threaded tube;

a threaded rod rotatably mounted in the outer threaded tube and having an outer wall formed with flat surface, the threaded rod being provided with a retractable rod which is slidable in the threaded rod;

a compression spring mounted between the retractable rod and the threaded rod;

an adjusting nut mounted on the threaded rod and rested on a lower end of the compression spring; and an urging nut mounted on the threaded rod and rested on a top end of the outer threaded tube, so that the threaded rod is locked on the outer threaded tube.

Further benefits and advantages of the present invention will become apparent after a careful reading of the detailed description with appropriate reference to the accompanying drawings.

BRIEF DESCRIPTION OF THE DRAWINGS

FIG. 1 is a side plan view of a conventional shock-absorbing device in accordance with the prior art;

FIG. 2 is a schematic operational view of the conventional shock-absorbing device as shown in FIG. 1 in adjustment;

DETAILED DESCRIPTION OF THE INVENTION

Figure 3:
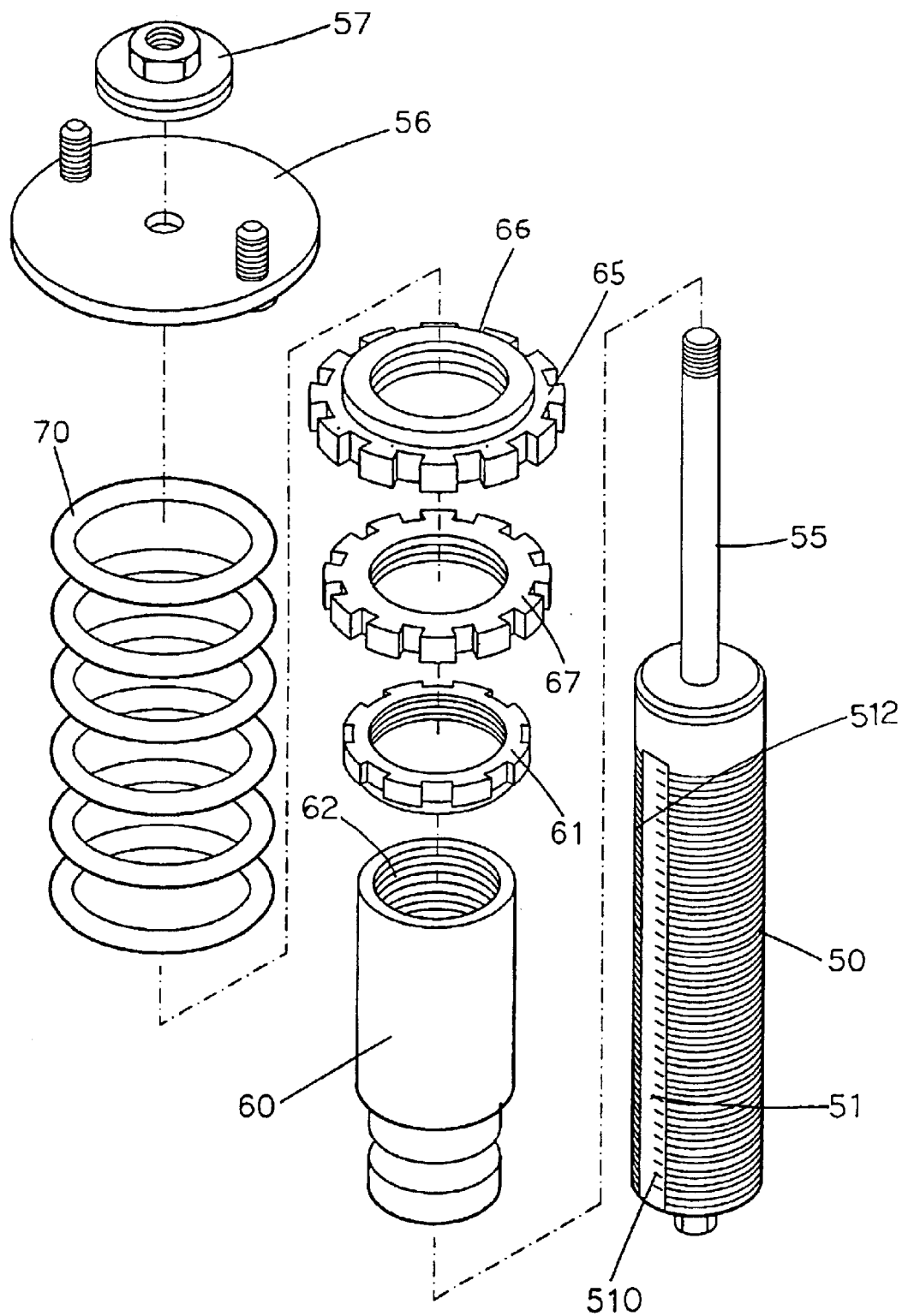
FIG. 3 is an exploded perspective view of a shock-absorbing device in accordance with the preferred embodiment of the present invention.
Figure 4:
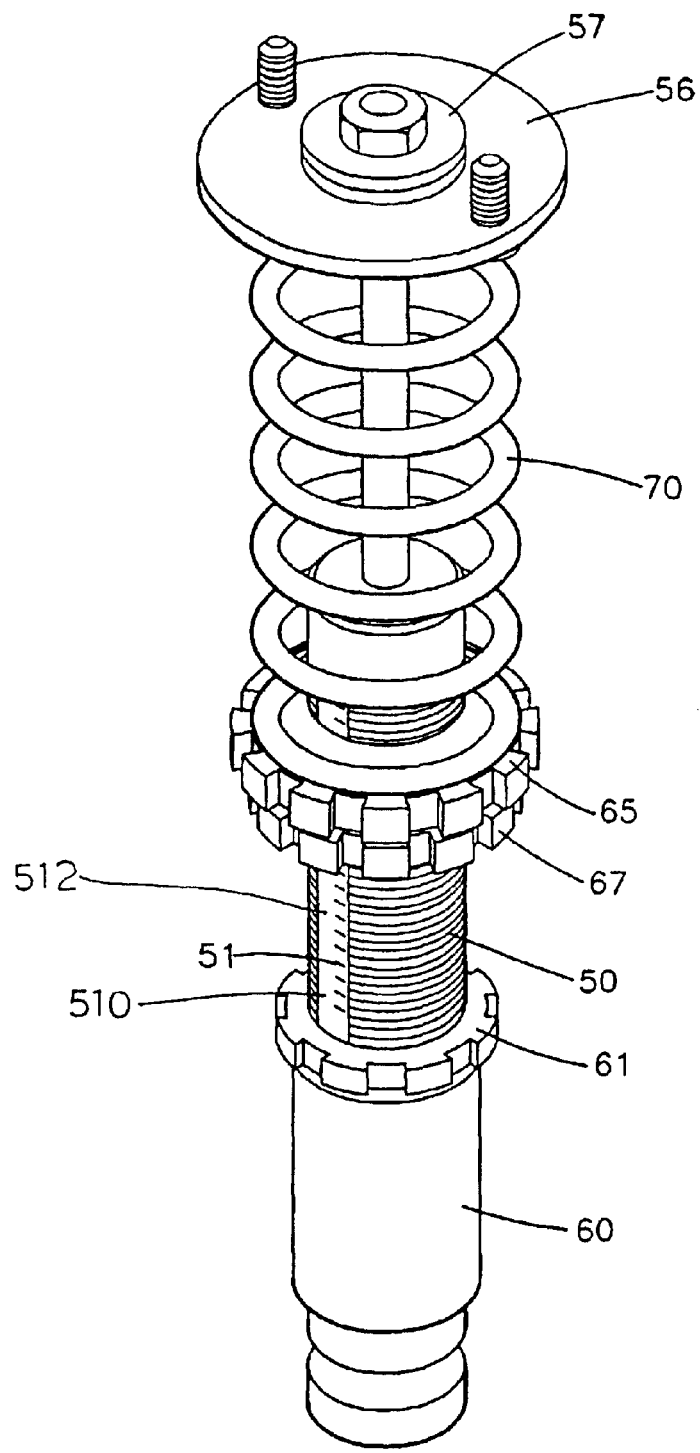
FIG. 4 is a perspective assembly view of the shock-absorbing device in accordance with the preferred embodiment of the present invention.
Figure 5:
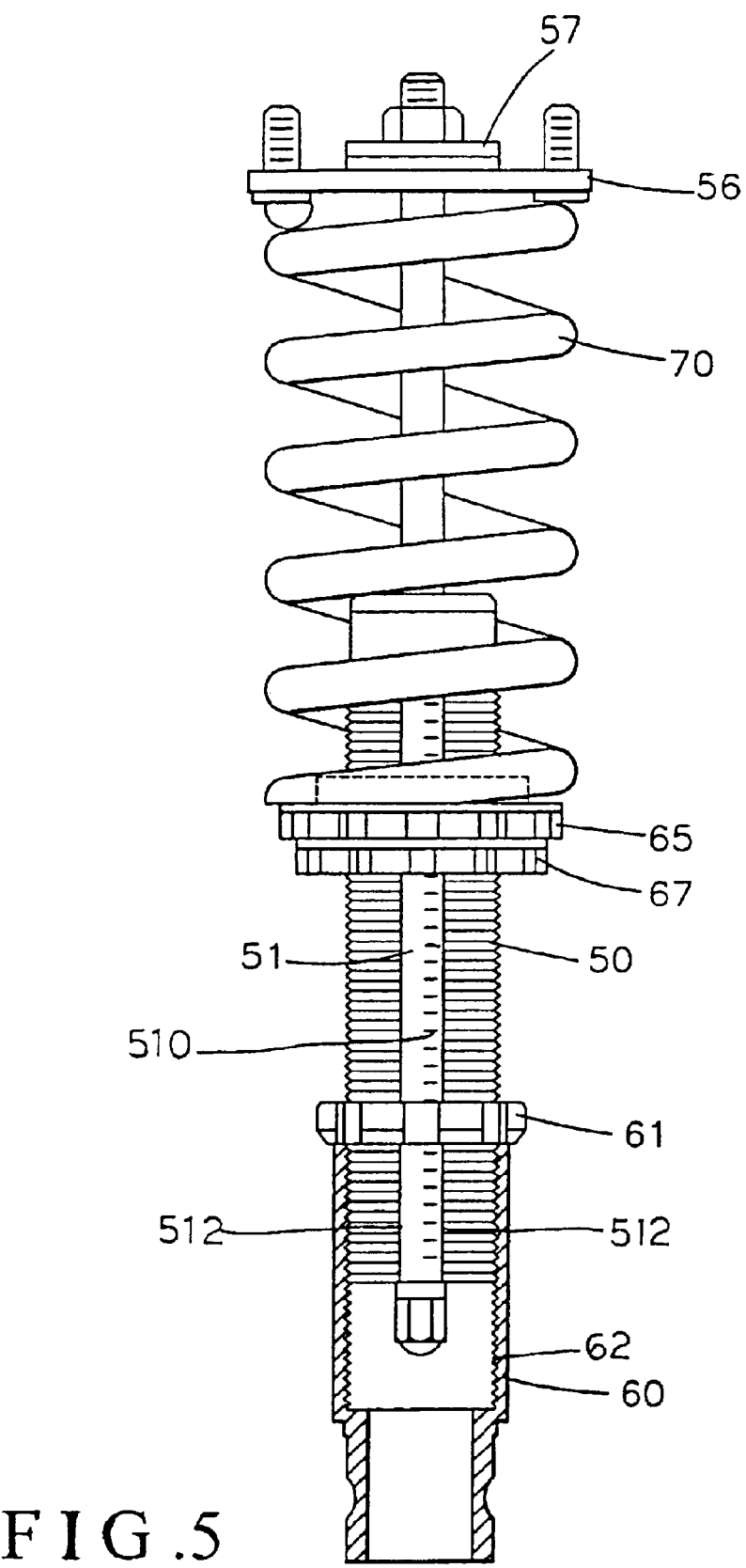
FIG. 5 is a side plan cross-sectional view of the shock-absorbing device as shown in FIG. 4.

Referring to the drawings and initially to FIGS. 3–5, a shock-absorbing device in accordance with the preferred embodiment of the present invention comprises a threaded rod 50, an outer threaded tube 60, and a compression spring 70.

The threaded rod 50 has an end provided with a retractable rod 55 protruding outward therefrom. The retractable rod 55 is slidable in the threaded rod 50. The threaded rod 50 has a cylindrical shape, and has an outer wall formed with flat surface 51 which is extended along a longitudinal direction of the threaded rod 50 and is extended through the whole length of the threaded rod 50. The flat surface 51 is formed with a plurality of scales 510. The flat surface 51 has two edges each formed with a scraper 512.

The outer threaded tube 60 is mounted on the threaded rod 50 and has an inner wall formed with an inner thread 62 screwed on the threaded rod 50.

The compression spring 70 is mounted between the retractable rod 55 and the threaded rod 50.

The shock-absorbing device further comprises an adjusting nut 65 mounted on the threaded rod 50, and an urging disk 56 mounted on the retractable rod 55. The compression spring 70 is mounted between the adjusting nut 65 and the urging disk 56. The adjusting nut 65 is formed with a stepped edge 66 for positioning a lower end of the compression spring 70.

The shock-absorbing device further comprises a positioning nut 57 screwed on a distal end of the retractable rod 55 and rested on the urging disk 56 to prevent the urging disk 56 from detaching from the retractable rod 55.

The shock-absorbing device further comprises an urging nut 61 mounted on the threaded rod 50 and rested on a top end of the outer threaded tube 60, so that the threaded rod 50 is locked on the outer threaded tube 60.

The shock-absorbing device further comprises an urging nut 67 mounted on the threaded rod 50 and rested on a bottom of the adjusting nut 65 for urging the adjusting nut 65 to prevent detachment of the adjusting nut 65.

In practice, the shock-absorbing device is mounted between the chassis (not shown) and the tire (not shown) of the automobile, with the urging disk 56 being connected to the chassis and with the outer threaded tube 60 being connected to the tire. Thus, the shock-absorbing device can provide a shock-absorbing function to the automobile.

Figure 6:
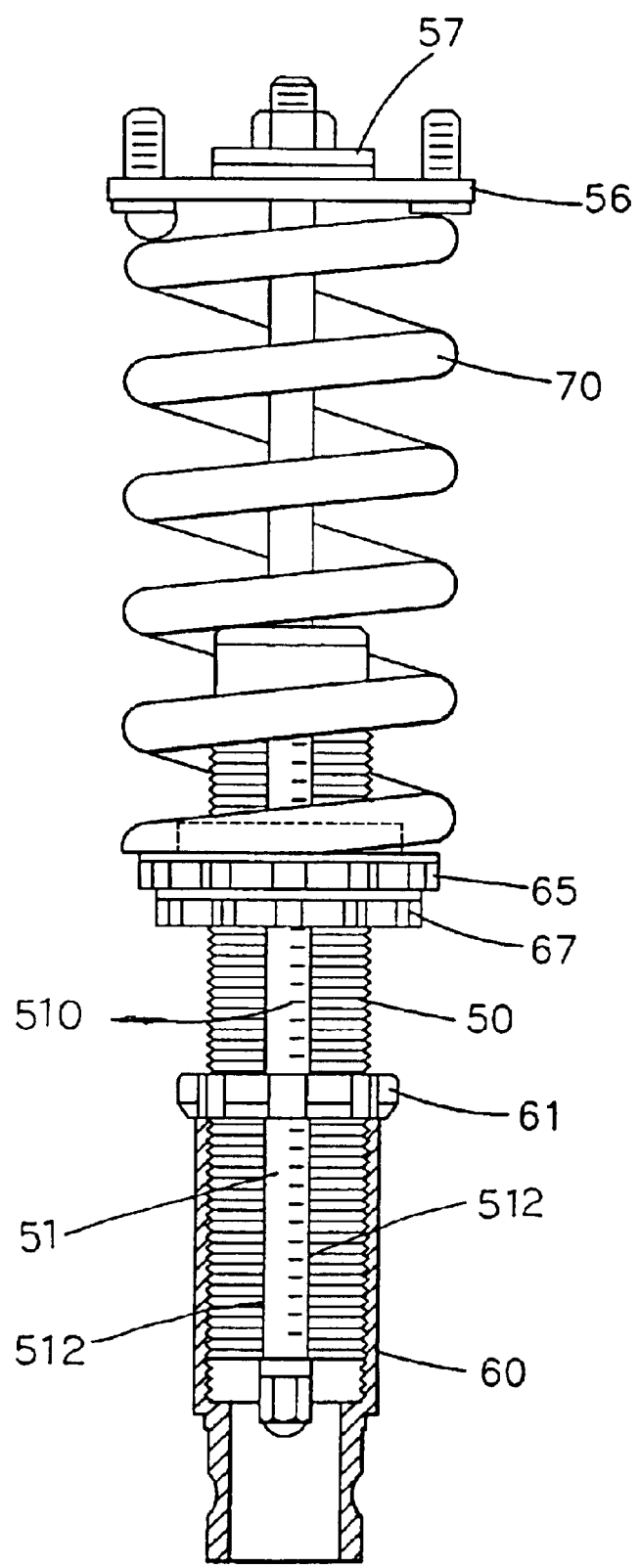
FIG. 6 is a schematic operational view of the shock-absorbing device as shown in FIG. 5 in adjustment.

In operation, referring to FIGS. 5 and 6 with reference to FIGS. 3 and 4, when the user wishes to adjust the height of the automobile, he only needs to unscrew the urging nut 61 so as to release the threaded rod 50 from the outer threaded tube 60, so that the threaded rod 50 can be rotated relative to the outer threaded tube 60, thereby adjusting the relative distance between the threaded rod 50 and the outer threaded tube 60, so as to adjust the whole length of the shock-absorbing device. Thus, the distance between the chassis and the tire of the automobile can be adjusted, so that the height of the automobile can be adjusted easily and conveniently.

In addition, the user can unscrew the urging nut 67 to release the adjusting nut 65, so that the adjusting nut 65 can be rotated relative to the threaded rod 50 to change the height of the adjusting nut 65, thereby adjusting the tension of the compression spring 70, and thereby micro-adjusting the height of the chassis of the automobile.

Accordingly, the shock-absorbing device in accordance with the present invention has the following advantages.

1. The urging nut 61 can be unscrewed, so that the threaded rod 50 can be rotated relative to the outer threaded tube 60, thereby adjusting the relative distance between the threaded rod 50 and the outer threaded tube 60, such that the height of the automobile can be largely adjusted easily and conveniently.

2. The urging nut 67 can be unscrewed, so that the adjusting nut 65 can be rotated relative to the threaded rod 50 to change the height of the adjusting nut 65 relative to the threaded rod 50, thereby adjusting the tension of the compression spring 70, and thereby micro-adjusting the height of the automobile easily and conveniently.

3. The scales 510 of the flat surface 51 can be used to indicate the length of the shock-absorbing device, so that the height of the automobile can be adjusted rapidly and exactly.

4. The scraper 512 of the flat surface 51 of the threaded rod 50 can be used to scrape the greasy dirt contained in the inner wall of the outer threaded tube 60 during rotation of the threaded rod 50, so as to clear the inner wall of the outer threaded tube 60.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A shock-absorbing device, comprising:

an outer threaded tube;

a threaded rod rotatably mounted in the outer threaded tube and having an outer wall formed with flat surface extended along a longitudinal direction of the threaded rod, the threaded rod being provided with a retractable rod which is slidable in the threaded rod;

a compression spring mounted between the retractable rod and the threaded rod;

an adjusting nut mounted on the threaded rod and rested on a lower end of the compression spring; and an urging nut mounted on the threaded rod and rested on a top end of the outer threaded tube, so that the threaded rod is locked on the outer threaded tube.

2. The shock-absorbing device in accordance with claim 1, wherein the flat surface of the threaded rod is extended through the whole length of the threaded rod.

3. The shock-absorbing device in accordance with claim 1, wherein the flat surface of the threaded rod is formed with a plurality of scales.

4. The shock-absorbing device in accordance with claim 1, wherein the flat surface of the threaded rod has two edges each formed with a scraper.

5. The shock-absorbing device in accordance with claim 1, further comprising an urging disk mounted on the retractable rod, wherein the compression spring is mounted between the adjusting nut and the urging disk.

6. The shock-absorbing device in accordance with claim 5, further comprising a positioning nut screwed on a distal end of the retractable rod and rested on the urging disk to prevent the urging disk from detaching from the retractable rod.

7. The shock-absorbing device in accordance with claim 1, wherein the adjusting nut is formed with a stepped edge for positioning the lower end of the compression spring.

8. The shock-absorbing device in accordance with claim 1, further comprising an urging nut member mounted on the threaded rod and rested on a bottom of the adjusting nut for urging the adjusting nut to prevent detachment of the adjusting nut.

* * * * *